(12) United States Patent
Kim et al.

(10) Patent No.: US 12,530,052 B2
(45) Date of Patent: Jan. 20, 2026

(54) COVER WINDOW AND MANUFACTURING METHOD OF COVER WINDOW

(71) Applicant: Samsung Display Co., LTD., Yongin-si (KR)

(72) Inventors: Sang Hoon Kim, Hwaseong-si (KR); Kyung-Man Kim, Anyang-si (KR); Sung Hoon Kim, Asan-si (KR); Seong Jin Hwang, Suwon-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 940 days.

(21) Appl. No.: 17/676,935

(22) Filed: Feb. 22, 2022

(65) Prior Publication Data

US 2022/0404876 A1 Dec. 22, 2022

(30) Foreign Application Priority Data

Jun. 16, 2021 (KR) .................. 10-2021-0078306

(51) Int. Cl.
*G06F 1/16* (2006.01)
*H10K 102/00* (2023.01)

(52) U.S. Cl.
CPC .......... *G06F 1/1656* (2013.01); *G06F 1/1641* (2013.01); *H10K 2102/311* (2023.02)

(58) Field of Classification Search
None
See application file for complete search history.

(56) References Cited

U.S. PATENT DOCUMENTS

| | | | |
|---|---|---|---|
| 10,216,230 B2 | 2/2019 | Kim et al. | |
| 10,222,834 B2 | 3/2019 | Choi et al. | |
| 10,416,721 B2 | 9/2019 | Shin et al. | |
| 10,429,895 B2 | 10/2019 | Lee | |
| 2019/0185376 A1* | 6/2019 | Ito | C03C 23/0025 |
| 2021/0066641 A1 | 3/2021 | Ai et al. | |

FOREIGN PATENT DOCUMENTS

| | | |
|---|---|---|
| CN | 109377886 A | 2/2019 |
| KR | 1020160006585 A | 1/2016 |
| KR | 1020170106599 A | 9/2017 |
| KR | 1020180079093 A | 7/2018 |
| KR | 1020190082339 A | 7/2019 |
| KR | 102181655 B1 | 11/2020 |

\* cited by examiner

*Primary Examiner* — Laura C Powers
(74) *Attorney, Agent, or Firm* — CANTOR COLBURN LLP

(57) ABSTRACT

A cover window includes a first member and a second member attached to the first member. A folding portion and a non-folding portion are defined in the cover window, the folding portion includes an inner surface which is compressed when the cover window is folded and an outer surface which is stretched when the cover window is folded, the first member is closer to the inner surface than the second member is, and the second member is closer to the outer surface than the first member is. The second member includes a plurality of support units in the folding portion and spaced apart from each other.

20 Claims, 14 Drawing Sheets

COVER WINDOW AND MANUFACTURING METHOD OF COVER WINDOW

This application claims priority to Korean Patent Application No. 10-2021-0078306, filed on Jun. 16, 2021, and all the benefits accruing therefrom under 35 U.S.C. § 119, the content of which in its entirety is herein incorporated by reference.

BACKGROUND (a) Field

The disclosure relates to a cover window and a manufacturing method of the cover window.

(b) Description of the Related Art

A display device, such as an organic light emitting diode display and a liquid crystal display device, includes a display panel manufactured by forming a plurality of layers and elements on a substrate. Recently, a flexible display panel and a flexible display device including the flexible display panel have been developed.

The flexible display device may be classified into a bendable display device, a foldable display device, a rollable display device, a stretchable display device, and the like depending on its usage and form. Among such flexible display devices, the foldable display device may be folded and unfolded like a book.

The foldable display device has desired characteristics by being configured to be folded in a compact form for portability, and to be unfolded for a wide screen when used.

SUMMARY

A cover window used in a foldable display may include a thin glass to be folded, and a risk of destroying the cover window may be increased when an impact is applied thereon, e.g., when an external object such as a pen falls on the cover window.

Embodiments of the disclosure are provided to increase a degree of freedom of a thickness of a cover window used in a foldable display to increase an impact strength and to improve stretchability of the cover window.

An embodiment of the invention provides a cover window including a first member and a second member attached to the first member, wherein a folding portion and a non-folding portion are defined in the cover window, the folding portion includes an inner surface which is compressed when the cover window is folded and an outer surface which is stretched when the cover window is folded, the first member is closer to the inner surface than the second member is, the second member is closer to the outer surface than the first member is, and the second member includes a plurality of support units disposed in the folding portion and spaced apart from each other.

In an embodiment, each of the support units may have a first surface attached to the first member and a second surface opposite to the first surface, where a width of the first surface of each of the support units may be greater than or equal to a width of the second surface of each of the support units.

In an embodiment, the second member may include a plurality of stretching units disposed between the support units, and each of the stretching units may have a first surface attached to the first member and a second surface opposite to the first surface, where a width of the second surface of each of the stretching units may be greater than or equal to a width of the first surface of each of the stretching units.

In an embodiment, a cross-section of the stretching unit may have a triangular shape, a funnel shape, a round funnel shape, or an hourglass shape.

In an embodiment, the first surface of each of the support units, which is attached to the first member, may have a width in a range of about 100 micrometers (μm) to about 1000 μm.

In an embodiment, first surfaces of the support units, which are attached to the first member, may be spaced apart from each other by a distance in a range of about 10 μm to 100 μm.

In an embodiment, the second member may have a thickness in a range of about 100 μm to about 1000 μm.

In an embodiment, the first member may include ions of at least one type of metal.

In an embodiment, the cover window may further include a passivation film attached to the first member, where the first member may be disposed between the passivation film and the second member.

In an embodiment, the cover window may further include a third member attached to the second member, where the second member may be disposed between the first member and the third member, and the third member may include a plurality of additional support units disposed in the folding portion and spaced apart from each other.

In an embodiment, an area in which the additional support units are positioned may be wider than an area in which the support units are positioned.

An embodiment of the invention provides a manufacturing method of a cover window, including: forming a first member; preparing an original substrate; etching a first pattern into the original substrate to have a first depth and etching a second pattern into the original substrate to have a second depth which is smaller than the first depth, where the second depth is smaller than a thickness of the original substrate; filling the first pattern and the second pattern with a resin material; etching a first surface of the original substrate to expose the resin material filled in the second pattern; cutting the original substrate along the second pattern to form a second member; and forming the cover window by attaching the first member to the second member.

In an embodiment, the etching of the first pattern and the second pattern may include etching the second pattern into the first surface and a second surface of the original substrate to have a third depth and a fourth depth, respectively, and the second depth may be a sum of the third depth and the fourth depth.

In an embodiment, the cover window may include a folding portion and a non-folding portion, the folding portion may include an inner surface which is compressed when the cover window is folded and an outer surface which is stretched when the cover window is folded, and the etching the first pattern and the second pattern may include etching the first pattern into of the original substrate an area corresponding to the folding portion.

In an embodiment, the first member may include a plurality of support units corresponding to the first pattern in the folding portion and spaced apart from each other, and the first surface of each of the support units, which is attached to the second member, may have a width in a range of about 100 μm to about 1000 μm.

In an embodiment, the first surfaces of the support units, which are attached to the second member, may be spaced apart from each other by a distance in a range of about 10 µm to about 100 µm.

In an embodiment, the first member may have a thickness in a range of about 100 µm to about 1000 µm.

In an embodiment, the first member may include ions of at least one type of metal.

In an embodiment, an area of the resin material filled in the first pattern has a first surface, which is attached to the first member, and a second surface opposite to the first surface, and a width of the second surface of the resin material filled in the first pattern is greater than or equal to a width of the first surface of the resin material filled in the first pattern.

In an embodiment, a cross-section of the resin material filled in the first pattern may have at least one of a triangular shape, a funnel shape, a round funnel shape, or an hourglass shape.

According to embodiments, impact strength of the cover window of the foldable display may be improved.

According to embodiments, since a process of manufacturing the cover of the foldable display device is simplified, a time and cost required for the process may be reduced.

According to embodiments, stretchability of the cover window of the foldable display may be improved.

DETAILED DESCRIPTION

Figure 1A:
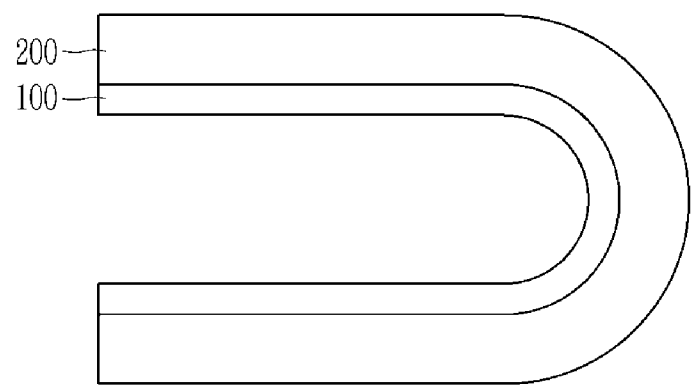
FIG. 1A and FIG. 1B are side views of a display device in a folded state according to an embodiment.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art.

To clearly describe the invention, parts that are irrelevant to the description are omitted, and like numerals refer to like or similar constituent elements throughout the specification.

Further, since sizes and thicknesses of constituent members shown in the accompanying drawings are arbitrarily given for better understanding and ease of description, the invention is not limited to the illustrated sizes and thicknesses. In the drawings, the thicknesses of layers, films, panels, regions, etc., are exaggerated for clarity. In the drawings, for better understanding and ease of description, the thicknesses of some layers and areas are exaggerated.

It will be understood that when an element such as a layer, film, region, or substrate is referred to as being "on" another element, it can be directly on the other element or intervening elements may also be present. In contrast, when an element is referred to as being "directly on" another element, there are no intervening elements present. Further, in the specification, the word "on" or "above" means positioned on or below the object portion, and does not necessarily mean positioned on the upper side of the object portion based on a gravitational direction.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Further, in the specification, the phrase "in a plan view" means when an object portion is viewed from above, and the phrase "in a cross-sectional view" means when a cross-section taken by vertically cutting an object portion is viewed from the side.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, embodiments of a cover window and a manufacturing method of the cover window according to the invention will be described in detail with reference to the accompanying drawings.

Figure 1B:
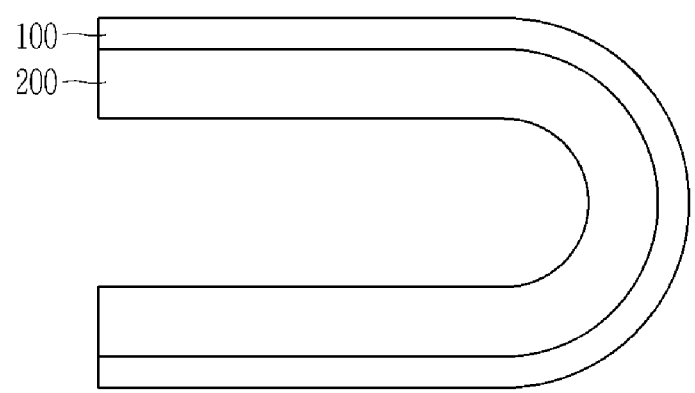
Figure 2:
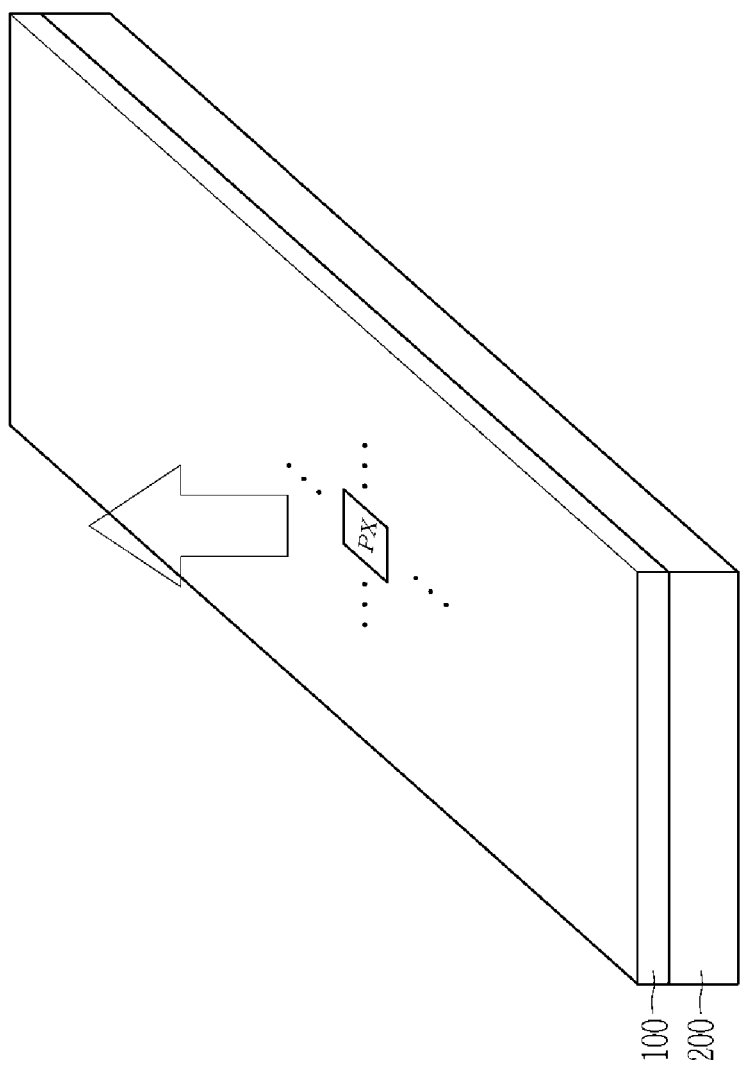
FIG. 2 is a schematic perspective view of a display device in an unfolded state according to an embodiment.

FIG. 1A and FIG. 1B are side views of a display device in folded state according to an embodiment, and FIG. 2 is a schematic perspective view of a display device in an unfolded state according to an embodiment.

Referring to FIGS. 1A and 1B, an embodiment of a display device may be a foldable display device. Referring to FIGS. 1A and 1B, an embodiment of the display device may include a display panel 200 and a cover window 100 positioned on one surface of the display panel 200.

Referring to FIG. 2, the display panel 200 may include a plurality of pixels PX configured to display an image. The display panel 200 may be a light emitting display panel in which each of the pixels PX includes a light emitting element, or a liquid crystal display panel in which the pixel PX includes a liquid crystal capacitor.

The surface on which the cover window 100 is positioned among surfaces of the display panel 200 may be a display surface on which an image is displayed. An arrow direction shown in FIG. 2 is a direction in which an image is displayed.

Referring to FIG. 1A, an embodiment of the display device may be folded in a direction in which opposite portions of the cover window 100 face each other. In such an embodiment, the display surface may not be exposed when the display device is folded, and the display surface may be exposed when the display device is unfolded.

Referring to FIG. 1B, an embodiment of the display device may be folded in a direction in which opposite portions of the display panel 200 face each other. In such an embodiment, the display surface may be exposed to an outside when the display device is folded, and the display surface may also be exposed when the display device is unfolded.

Figure 3:
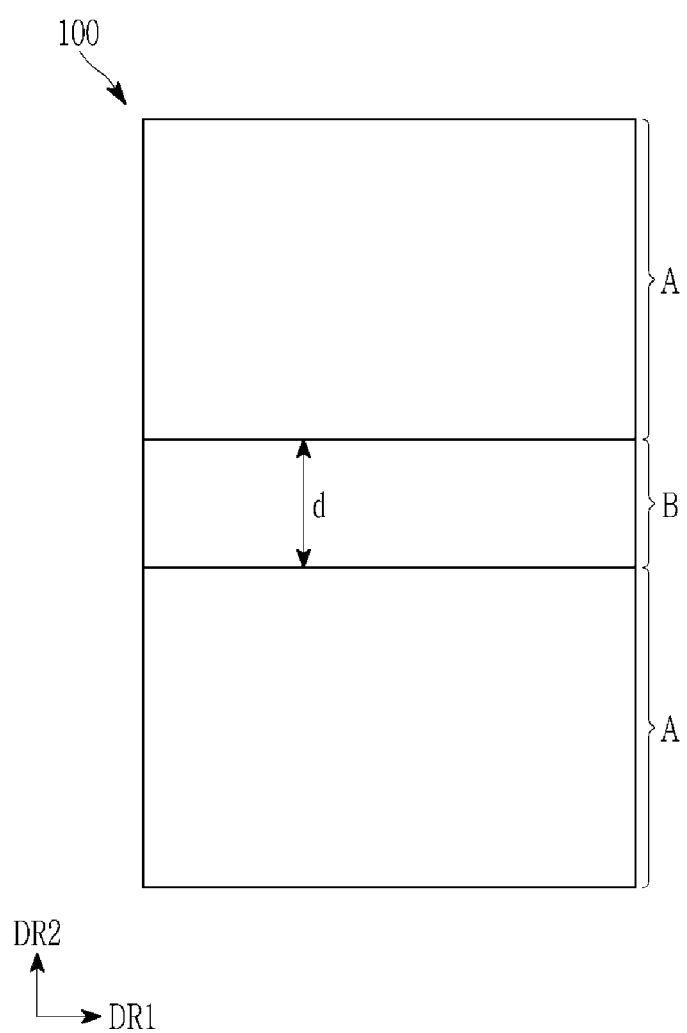
FIG. 3 is a top plane view of a cover window of a display device in an unfolded state according to an embodiment.
Figure 4:
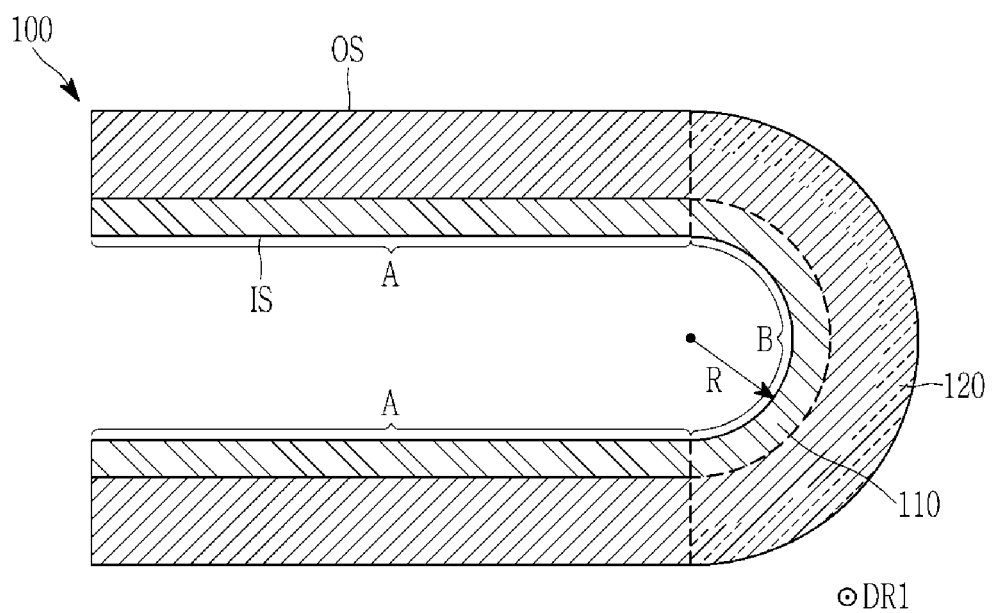
FIG. 4 is a cross-sectional view of a cover window of a display device according to an embodiment, which illustrates a side view showing a structure when it is folded.

FIG. 3 is a top plan view of the cover window 100 of a display device in an unfolded state according to an embodiment, and FIG. 4 is a cross-sectional view of the cover the window 100 of a display device in a folded state according to an embodiment.

Referring to FIG. 3, an embodiment of the cover window 100 includes a folding portion B that is bent when folded and a non-folding portion A that is not bent (or flat) when folded. The cover window 100 may be folded with respect to an imaginary folding axis in a first direction DR1 along a second direction DR2 that is perpendicular to the first direction DR1.

Referring to FIG. 3 and FIG. 4, when a radius of curvature when the cover window 100 is folded is R, a length d of the folding portion B may be $\partial R$.

The radius of curvature R may be in a range of about 1 millimeter (mm) to about 2 mm, but the disclosure is not limited thereto.

Since the non-folding portion A is a portion that is not bent, it may also be referred to as a flat portion.

In an embodiment, as shown in FIG. 4, when the cover window 100 is folded, a surface positioned inside and having opposite portions thereof facing each other is defined as an inner surface IS, and a surface positioned outside is defined as an outer surface OS. In such an embodiment, the surface that is compressed during folding is the inner surface IS of the cover window 100, and the surface that is tensioned is the outer surface OS of the cover window 100.

In an embodiment illustrated in FIG. 1A described above, when the cover window 100 is coupled to the display panel 200, an image may be displayed through the inner surface IS of the cover window 100, and the display panel 200 and the like may be in contact with the outer surface OS. In such an embodiment, the inner surface IS of the cover window 100 may be a display surface, and the outer surface OS may be a non-display surface.

In an embodiment illustrated in FIG. 1B described above, when the cover window 100 is coupled to the display panel 200, an image may be displayed through the outer surface OS of the cover window 100, and the display panel 200 and the like may be in contact with the inner surface IS. In such an embodiment, the outer surface OS of the cover window 100 may be a display surface, and the inner surface IS may be a non-display surface.

An embodiment of the cover window 100 includes a cover glass 110 and a support member 120.

The cover glass 110 may include a silicate type of glass. In an embodiment, the cover glass 110 may contain ions of alkali or alkaline earth metal, e.g., such as ions of Na, K, Li, Mg, Ca, Sr, Ba, or Al. The ions of alkali or alkaline earth metals may generate non-bridging oxygen ("NBO"). In an embodiment, a passivation film may be attached to one surface of the cover glass 110.

In a case where the cover glass 110 is too thin, foldability is high, but wrinkles may occur or strength may be decreased when reinforced, and in the case where the cover glass 110 is formed too thick, flexibility, a restoring force, and an elastic force in a folding area are reduced, and a folding characteristic is deteriorated. Accordingly, in an embodiment, a thickness of the cover glass 110 may be in a range of about 10 micrometers (μm) to 100 μm.

The support member 120 is attached to one surface of the cover glass 110. The support member 120 may prevent the cover glass 110 from being damaged when an impact is applied to the cover glass 110. When the cover glass 110 is folded, the support member 120 is desired to be properly elongated to correspond to the folding portion B. The support member 120 will hereinafter be described in detail with reference to FIGS. 5A and 5B together with FIG. 4.

Figure 5A:
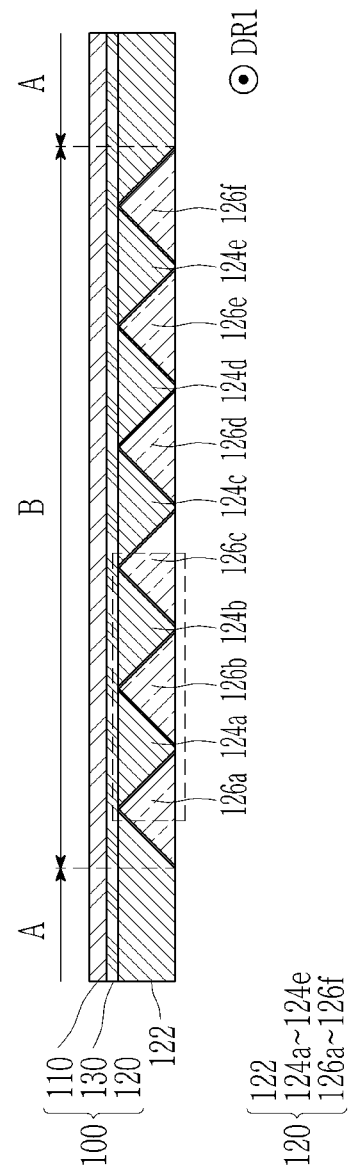
FIG. 5A is a cross-sectional view of a cover window of a display device in an unfolded state according to an embodiment.
Figure 5B:
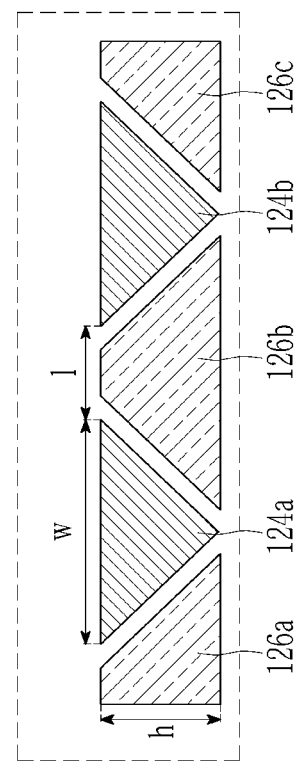
FIG. 5B is an enlarged view of the encircled portion of FIG. 5A.

FIG. 5A is a cross-sectional view of a cover window of a display device in an unfolded state according to an embodiment, and FIG. 5B is an enlarged view of the encircled portion of FIG. 5A.

Referring to FIGS. 5A and 5B, an embodiment of the cover window 100 may include a cover glass 110, a support member 120 and an adhesive layer 130 between the cover glass 110 and the support member 120. In an embodiment of the cover window 100, the support member 120 includes a substrate 122, a plurality of support units 124a to 124e, and a plurality of stretching units 126a to 126f.

The support member 120 may have a thickness h corresponding to the radius of curvature R when the cover window 100 is folded. In general, when the support member 120 is included in the foldable cover window 100, the thickness of the cover window 100 is desired to be thin, but the thickness of the cover window 100 is desired to be greater than or equal to a certain thickness to secure the strength characteristic. In an embodiment, for example, where the radius of curvature R is in a range of about 1 mm to about 2 mm, the thickness h of the support member 120 may be in a range of about 100 μm to about 1000 μm.

The substrate 122 may include glass, quartz, plastic, or the like.

The support units 124a to 124e may be formed by etching the substrate 122. The substrate 122 may be etched at a predetermined angle (α, where 0°<α≤180°). Shapes of the support units 124a to 124e and the stretching units 126a to 126f may be determined based on a shape by which the substrate 122 is etched. In an embodiment, a cross-section of each of the support units 124a to 124e may be an inverted triangle or an inverted trapezoid. In an embodiment, cross-sections of the support units 124a to 124e may have various shapes, which will be described later with reference to FIG. 6 to FIG. 9.

The support units 124a to 124e have a width w in a range of about 100 μm to about 1000 μm. Since each of the support units 124a to 124e has a width equal to or greater than a thickness (e.g., 0.2 mm to 1 mm) of a nib at a time of pen drop, an impact due to pen drop impact may be effectively dispersed between patterns.

In an embodiment, the support units 124a to 124e are spaced apart from each other by a predetermined distance I. Herein, the predetermined distance I may be in a range of about 10 μm to about 100 μm such that easiness in a manufacturing process is improved while the predetermined distance I may be less than or equal to the thickness (e.g., 0.2 mm to 1 mm) of the nib at the time of pen drop.

The impact may be dispersed between the patterns to increase the rigidity against the pen drop by implementing the support units 124a to 124e in the folding portion B of the cover glass 110, such that both strength and folding characteristics may be improved.

A corresponding one of the stretching units 126a to 126f is positioned between the support units 124a to 124e and between the substrate 122 and the support units 124a and 124e. The stretching units 126a to 126f may be enabled to provide the support member 120 with a uniform thickness as a whole, to absorb an impact force, and to prevent an empty space (air layer) from being present when bonded to a front surface of the display panel, thereby improving visibility and adhesion.

The stretching units 126a to 126f may be formed by filling a transparent resin material between the support units 124a to 124e and between the substrate 122 and the support units 124a and 124e. The transparent resin material may be a transparent resin such as an optically clear resin having substantially a same refractive index as that of the substrate 122. In one embodiment, for example, the transparent resin material may include at least one selected from acrylic, epoxy, silicone, urethane, a urethane compound, a urethane acrylic compound, a hybrid sol gel and a siloxane type. Such resins may be mixed in various combinations depending on the properties of the transparent resin material to enhance strength and elasticity.

Each of the stretching units 126a to 126f may be formed such that a width of a corresponding surface of the outer surface OS is greater than or equal to a width of a surface attached to the cover glass 110 to be easily stretched in a folded state. In an embodiment, the cross-section of each of the stretching units 126a to 126f will be described as being triangular to trapezoidal. In an embodiment, cross-sections of the stretching units 126a to 126f may have various shapes, which will be described later with reference to FIG. 6 to FIG. 9.

According to an embodiment of the disclosure, a pen drop evaluation result by a pen with a 0.3 mm pen nip of the cover window 100 is shown in Table 1 below.

TABLE 1

| Structure | Cover glass (Comparative Example1) | Cover glass + passivation film (Comparative Example2) | Cover glass + support member (Embodiment) |
|---|---|---|---|
| Bright spot revealed | 1 cm | 4 cm | 15 cm |
| Window damaged | 1 cm | 12 cm | 15 cm |

As shown in Table 1, since the cover window 100 according to an embodiment is damaged when the pen is dropped from a height of 15 cm, which is higher than those of Comparative Examples 1 and 2, it can be seen that an impact resistance characteristic of an embodiment of the cover window 100 is improved. Next, various embodiments of the support member 120 will be described with reference to FIG. 6 to FIG. 9.

FIG. 6 to FIG. 9 are cross-sectional views of various embodiments of a cover window of a display device in an unfolded state.

Figure 6:
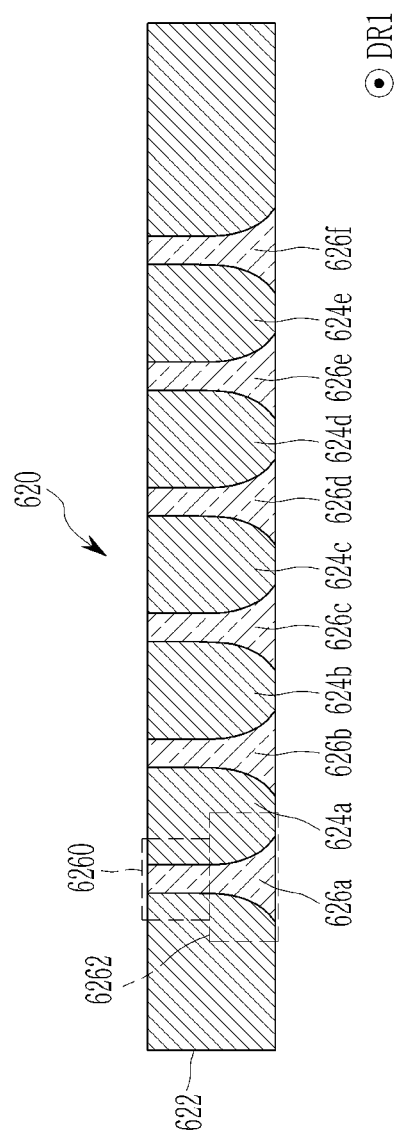
FIG. 6 to FIG. 9 are cross-sectional views of various embodiments of a cover window of a display device in an unfolded state.

Referring to FIG. 6, an embodiment of a support member 620 includes a substrate 622, a plurality of support units 624a to 624e, and a plurality of stretching units 626a to 626f.

In such an embodiment, each of the support units 624a to 624e may have a bullnose-like cross-section. The substrate 622 may be etched in a way such that an angle α becomes 90° in a first region 6260, then may be etched by gradually decreasing the angle α from a predetermined depth, i.e., in a second region 6262. Then, the support units 624a to 624e may be formed to have the form of FIG. 6.

The stretching units 626a to 626f may be formed by filling a transparent resin material between the support units 624a to 624e and between the substrate 622 and the support units 624a and 624e.

Figure 7:
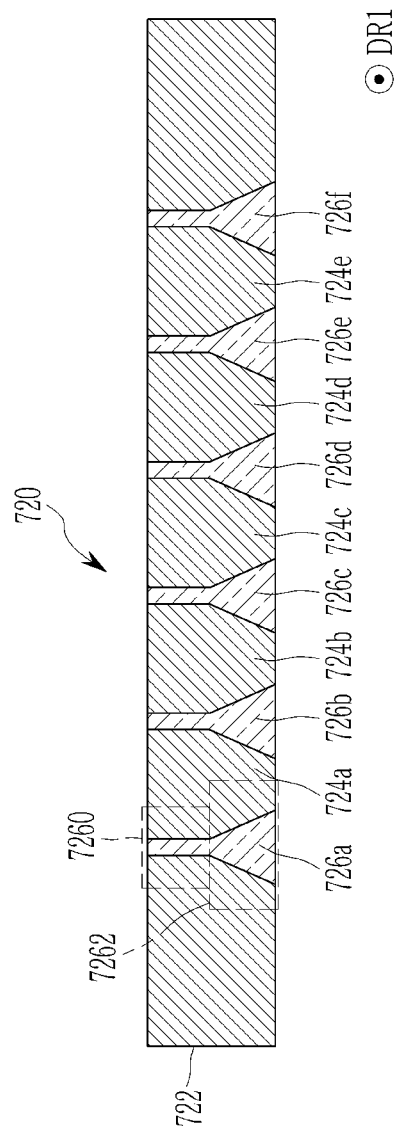

Next, referring to FIG. 7, in an alternative embodiment, a support member 720 includes a substrate 722, a plurality of support units 724a to 724e, and a plurality of stretching units 726a to 726f.

In such an embodiment, each of the support units 724a to 724e may have a trapezoidal cross-section. The substrate 722 may be etched such that an angle α becomes 90° in a first region 7260, then may be etched by decreasing the angle α to a specific angle (e.g., 60°) in a second region 7262. Then, the support units 724a to 724e may be formed to have the form of FIG. 7.

The stretching units 726a to 726f may be formed by filling a transparent resin material between the support units 724a to 724e and between the substrate 722 and the support units 724a and 724e. Each of the stretching units 726a to 726f may have a funnel-like cross-section.

Figure 8:
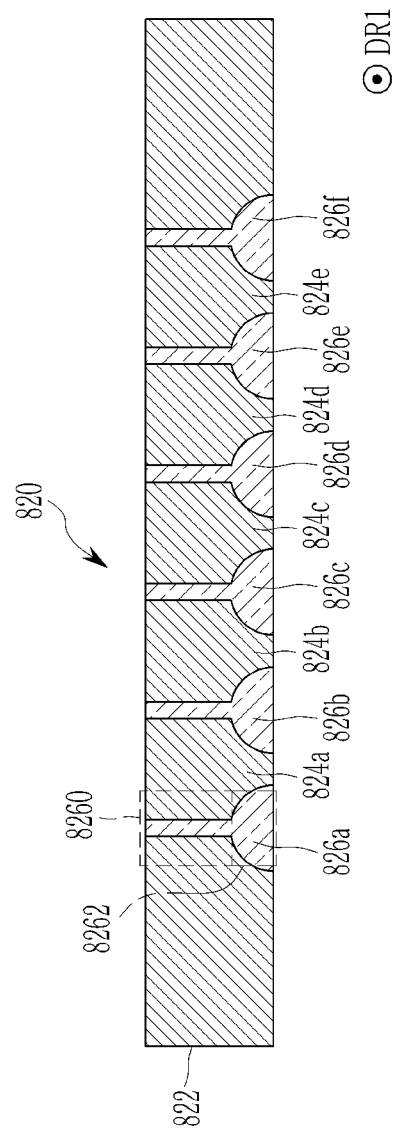

Next, referring to FIG. 8, in another alternative embodiment, a support member 820 includes a substrate 822, a plurality of support units 824a to 824e, and a plurality of stretching units 826a to 826f.

In such an embodiment, the substrate 822 may be etched in a way such that an angle α becomes 90° in a first region 8260, and may be etched by decreasing the angle α to a first angle (e.g., 1°) in a second region 8262 and then by gradually increasing it to a second angle (e.g., 90°). Then, the support units 824a to 824e may be formed to have the form of FIG. 8.

The stretching units 826a to 826f may be formed by filling a transparent resin material between the support units 824a to 824e and between the substrate 822 and the support units 824a and 824e. Each of the stretching units 826a to 826f may have a round funnel-like cross-section.

Figure 9:
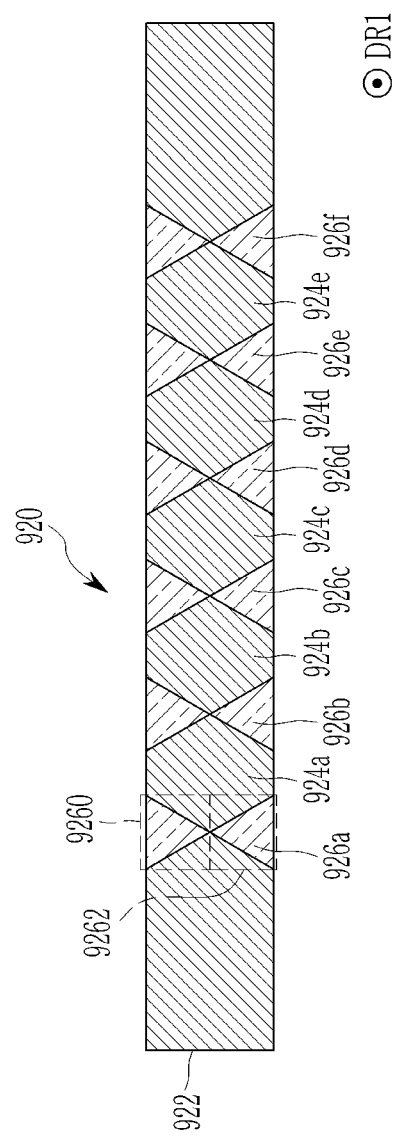

Next, referring to FIG. 9, in another alternative embodiment, a support member 920 includes a substrate 922, a plurality of support units 924a to 924e, and a plurality of stretching units 926a to 926f.

In such an embodiment, the substrate 922 may be etched in a way such that an angle α becomes a first angle (e.g., 120°) in a first region 9260, and may be etched such that the angle α becomes a second angle (e.g., 60°) in a second region 9262. Then, the support units 924a to 924e may be formed to have the form of FIG. 9.

The stretching units 926a to 926f may be formed by filling a transparent resin material between the support units 924a to 924e and between the substrate 922 and the support units 924a and 924e. Each of the stretching units 926a to 926f may have an hourglass-like cross-section.

In such embodiments, the substrate may be etched in various shapes to form support units and stretching units. The support units and the stretching units may have a cross-sectional shape obtained by combining the above-described shapes, but not being limited to the embodiments described above.

Next, an embodiment of a manufacturing method of the cover window will be described with reference to FIG. 10 and FIG. 11.

Figure 10:
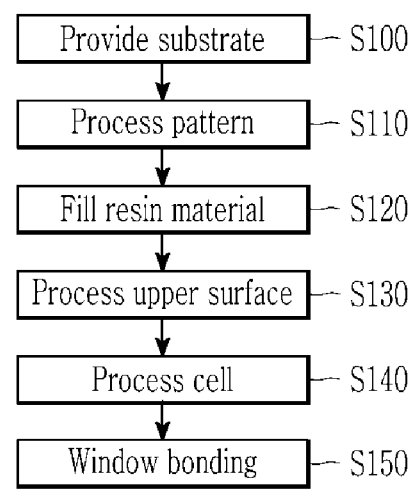
FIG. 10 is a flowchart showing a manufacturing method of a cover window according to an embodiment.

FIG. 10 is a flowchart showing a manufacturing method of a cover window according to an embodiment, and FIG. 11A to FIG. 11E are cross-sectional views showing an embodiment of the manufacturing method of the cover window of FIG. 10.

First, a substrate for forming a support member is provided (S100). Herein, the substrate will be described as an original (or mother) substrate capable of manufacturing a plurality of cover windows.

Figure 11A:
FIG. 11A to FIG. 11E are cross-sectional views showing an embodiment of the manufacturing method of the cover window of FIG. 10.

Then, as illustrated in FIG. 11A, patterns 1125 and 1127 for forming a support unit 1124 and a cell unit boundary line on the substrate 1122 are processed, e.g., etched (S110). The substrate 122 may be dry etched or wet etched. In one embodiment, for example, the substrate 122 may be processed by using laser induced deep etching ("LIDE").

In an embodiment, the substrate 1122 may be penetrated by the pattern 1125. In such an embodiment, a depth of the pattern 1125 may be equal to a thickness of the substrate 122. In an alternative embodiment, the pattern 1127 does not penetrate the substrate 1122. In such an embodiment, a depth of the pattern 1127 may be smaller than the thickness of the substrate 1122.

This will be described in greater detail with reference to FIG. 12 to FIG. 14.

Figure 12:
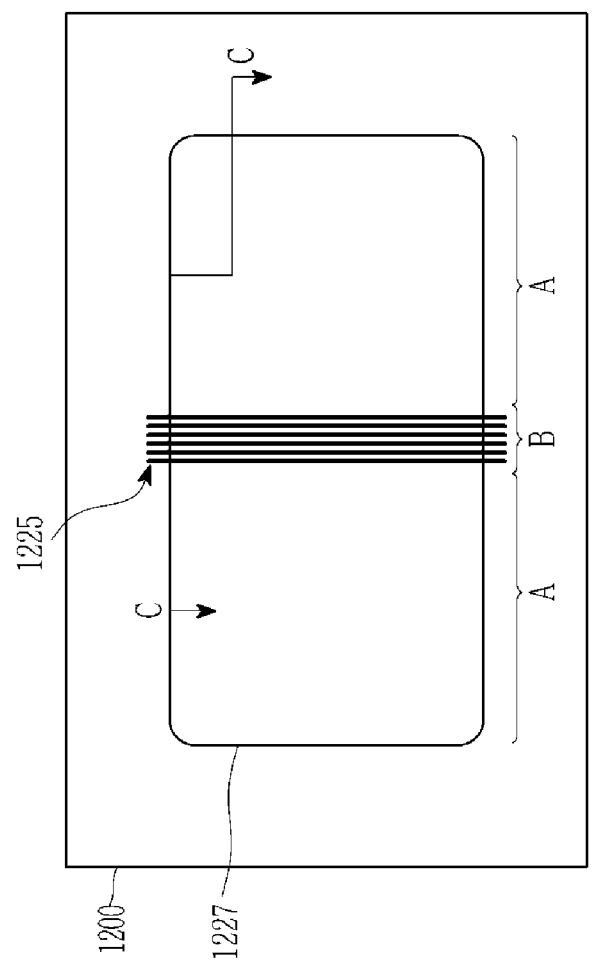
FIG. 12 is a top plan view showing a support substrate of a cover window divided into cell units.
Figure 13:
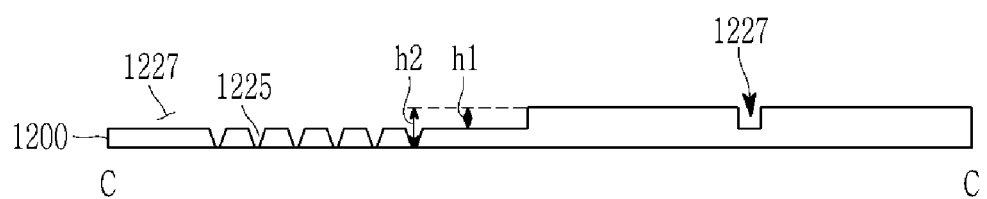
FIG. 13 is a cross-sectional view of an embodiment of the support substrate of FIG. 12 taken along line C-C.
Figure 14:
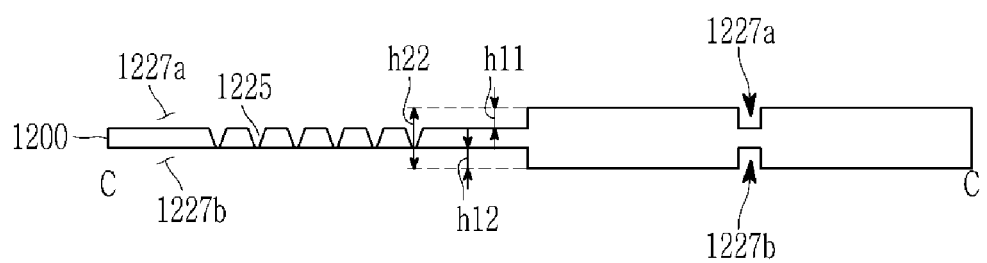
FIG. 14 is a cross-sectional view of an alternative embodiment of the support substrate of FIG. 12 taken along line C-C.

FIG. 12 is a top plan view showing a support substrate of a cover window divided into cell units, FIG. 13 is a cross-sectional view of an embodiment of the support substrate of FIG. 12 taken along line C-C, and FIG. 14 is a cross-sectional view of an alternative embodiment of the support substrate of FIG. 12 taken along line C-C.

In an embodiment, as illustrated in FIG. 12, patterns 1225 and 1227 are formed on an original substrate 1200. The pattern 1225 is etched to form the support units 1124. The pattern 1225 is positioned in the folding area B, and is not positioned in the non-folding area A. The pattern 1227 is etched to form cell-by-cell boundaries.

In an embodiment, as illustrated in FIG. 13, the pattern 1227 may be formed with a first depth h1 on the original substrate 1200. The pattern 1225 may be formed to a second depth h2 on the original substrate 1200. Herein, the first depth h1 is smaller than the second depth h2. The first depth h1 may be smaller than a thickness of the original substrate 1200.

In an embodiment, as shown in FIG. 12, the pattern 1227 may have a quadrangular cross-section, but not being limited thereto. Alternatively, the pattern 1227 may have a polygonal shape, a semicircular shape, a bullnose shape, a demi-bullnose shape, a funnel shape, or the like, for example.

In an alternative embodiment, as illustrated in FIG. 14, the pattern 1227a may be formed to have a first first depth h11 on a first surface of the original substrate 1200, and the pattern 1227b may be formed to have a second first depth h12 on a second surface thereof. The pattern 1225 may be formed to a second depth h22 on the original substrate 1200. Herein, a first depth (h11+h12), which is obtained by summing the first first depth h11 and the second first depth h12, is smaller than a second depth h22. The first depth (h11+h12) may be smaller than a thickness of the original substrate 1200.

Each of patterns 1227a and 1227b may have a quadrangular cross-section, but not being limited thereto. Alternatively, each of patterns 1227a and 1227b may have a polygonal shape, a semicircular shape, a bullnose shape, a demi-bullnose shape, a funnel shape, or the like, thereto for example. In an embodiment, the patterns 1227a and 1227b formed on the opposite surfaces may have cross-sections having different shapes from each other.

The support units 1124 may have a width w in a range of about 100 µm to about 1000 µm, and may be spaced apart from each other by a distance I in a range of about 10 µm to about 100 µm by the pattern 1125 formed in the process S110. In such an embodiment, the support units 1124 may be formed in the form as described with reference to FIG. 5A to FIG. 9.

Figure 11B:
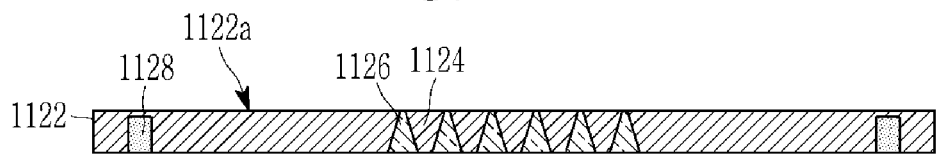

In an embodiment, as illustrated in FIG. 11B, the formed patterns 1125 and 1127 are filled with transparent resin materials 1126 and 1128 (S120).

Figure 11C:
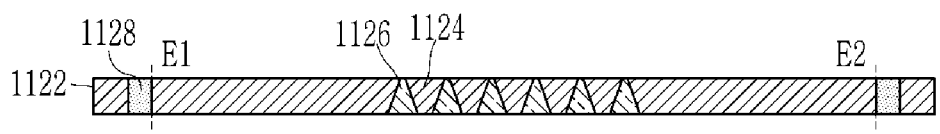
Figure 11D:
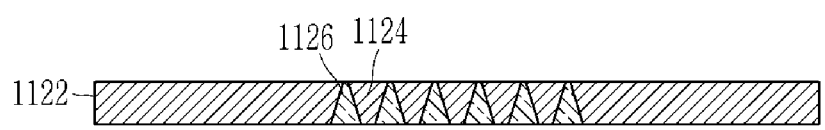

Next, as illustrated in FIG. 11C, a first surface 1122*a* of the substrate 1122 is etched (S130), is cut along the cell unit boundary lines E1 and E2, and as illustrated in FIG. 11D, a support member 1120 is processed in units of cells (S140).

Figure 11E:
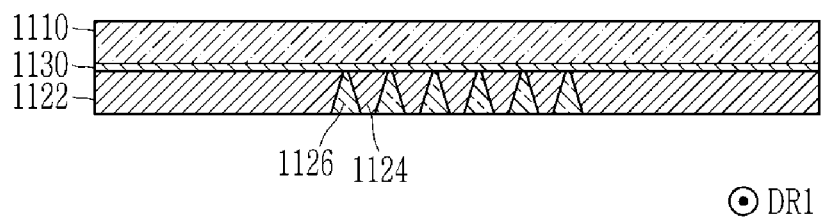

As illustrated in FIG. 11E, the cell-unit support member 1120 is combined or laminated with a cover glass 1110 (S150). The cover glass 1110 and the support member 1120 may be bonded to each other by applying or coating an adhesive layer 1130 on a first surface of the support member 1120.

In an embodiment, a passivation film may be further provided or laminated on an upper surface of the cover glass 1110, i.e., on a surface to which the support member 1120 is not bonded.

In an embodiment, the cover glass 1110 may be bonded to a plurality of support members 1120 to improve impact resistance. This will be described with reference to FIG. 15 and FIG. 16.

Figure 15:
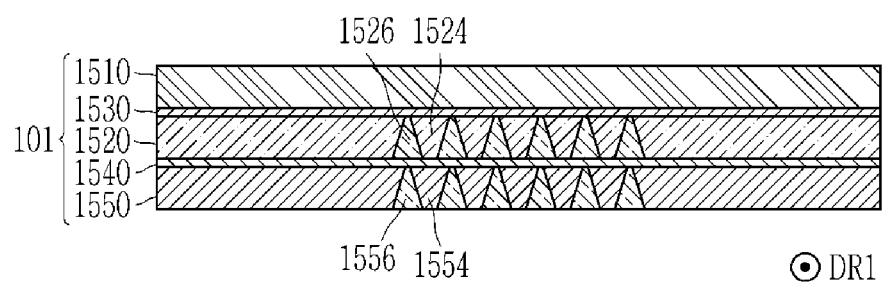
FIG. 15 and FIG. 16 are cross-sectional views showing a structure of alternative embodiments of a cover window of a display device in an unfolded state.
Figure 16:
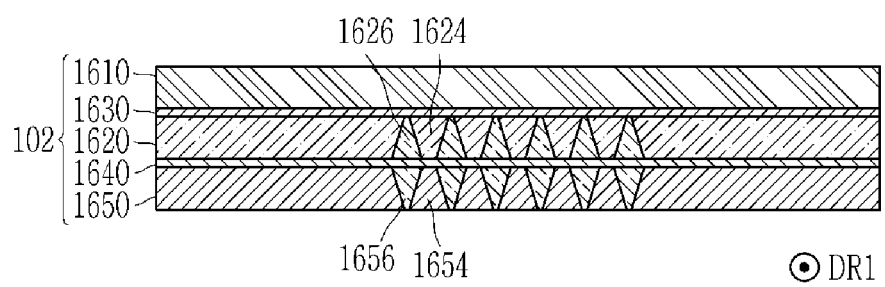

FIG. 15 and FIG. 16 are cross-sectional views showing a structure of alternative embodiments of a cover window of a display device in an unfolded state.

Referring to FIG. 15, in an embodiment of a cover window 101, a plurality of support members 1520 and 1550 may be attached to a first surface of a cover glass 1510 of the cover window 101 by adhesive layers 1530 and 1540 therebetween. In stretching units 1526 of the support member 1520, a width of a surface thereof attached to the support member 1550 is greater than that of a surface thereof attached to the cover glass 1510. In stretching units 1556 of the support member 1550, a width of a surface corresponding to the outer surface OS is greater than or equal to that of a surface thereof attached to the support member 1520. In such an embodiment, the support units 1524 and 1554 of the two support members 1520 and 1550 have tapered shapes with similar angles.

In an embodiment, the support member 1550 closer to the outer surface OS may have fewer or more support units 1554 in the folding area B than the support member 1520.

In an embodiment, an area in which the support units 1554 are positioned on the support member 1550 closer to the outer surface OS may be wider than an area in which the support units 1524 are positioned on the support member 1520.

Referring to FIG. 16, in an embodiment of a cover window 102, a plurality of support members 1620 and 1650 may be attached to a first surface of a cover glass 1610 of the cover window 102 by adhesive layers 1630 and 1640 therebetween. In stretching units 1626 of the support member 1620, a width of a surface thereof attached to the support member 1650 is greater than that of a surface thereof attached to the cover glass 1610. In stretching units 1656 of the support member 1650, a width of a surface corresponding to the outer surface OS is smaller than or equal to that of a surface thereof attached to the support member 1620. In such an embodiment, the support units 1624 and 1654 of the two support members 1620 and 1650 have tapered shapes at different angles.

In an embodiment, the support member 1650 closer to the outer surface OS may have fewer or more support units 1654 in the folding area B than the support member 1620.

In an embodiment, an area in which the support units 1654 are positioned on the support member 1650 closer to the outer surface OS may be wider than an area in which the support units 1624 are positioned on the support member 1620.

In an embodiment, the support member 1650 may be positioned on the upper surface of the cover glass 1610 of the cover window 102, and the support member 1620 may be positioned on the lower surface of the cover window 102. In an embodiment, in stretching units 1626 of the support member 1620, a width of a surface thereof attached to the support member 1650 is greater than that of a surface thereof attached to the cover glass 1610. In stretching units 1656 of the support member 1650, a width of a surface corresponding to the outer surface OS is smaller than or equal to that of a surface thereof attached to the support member 1620. In such an embodiment, the support units 1624 and 1654 of the two support members 1620 and 1650 have tapered shapes at different angles. This cover window 102 may be foldable with the folding direction shown in FIG. 1A or FIG. 1B.

The invention should not be construed as being limited to the embodiments set forth herein. Rather, these embodiments are provided so that this disclosure will be thorough and complete and will fully convey the concept of the invention to those skilled in the art.

While the invention has been particularly shown and described with reference to embodiments thereof, it will be understood by those of ordinary skill in the art that various changes in form and details may be made therein without departing from the spirit or scope of the invention as defined by the following claims.

What is claimed is:

1. A cover window comprising:
a first member; and
a second member attached to the first member,
wherein a folding portion and a non-folding portion are defined in the cover window,
the folding portion includes an inner surface which is compressed when the cover window is folded and an outer surface which is stretched when the cover window is folded,
the first member is closer to the inner surface than the second member is,
the second member is closer to the outer surface than the first member is, and
the second member includes a plurality of support units disposed in the folding portion and spaced apart from each other,
the second member includes a plurality of stretching units disposed between the support units, and
each of the support units and each of the stretching units extends entirely through the second member.

2. The cover window of claim 1, wherein
each of the support units has a first surface attached to the first member and a second surface opposite to the first surface,
wherein a width of the first surface of each of the support units is greater than or equal to a width of the second surface of each of the support units.

3. The cover window of claim 1, wherein
each of the stretching units has a first surface attached to the first member and a second surface opposite to the first surface, wherein a width of the second surface of each of the stretching units is greater than or equal to a width of the first surface of each of the stretching units.

4. The cover window of claim 3, wherein a cross-section of the stretching unit has a triangular shape, a funnel shape, a round funnel shape, or an hourglass shape.

5. The cover window of claim 2, wherein the first surface of each of the support units, which is attached to the first member, has a width in a range of about 100 µm to about 1000 µm.

6. The cover window of claim 2, wherein first surfaces of the support units, which are attached to the first member, are spaced apart from each other by a distance in a range of about 10 µm to about 100 µm.

7. The cover window of claim 1, wherein the second member has a thickness in a range of about 100 µm to about 1000 µm.

8. The cover window of claim 1, wherein the first member includes ions of at least one type of metal.

9. The cover window of claim 1, further comprising: a passivation film attached to the first member, wherein the first member is disposed between the passivation film and the second member.

10. The cover window of claim 1, further comprising a third member attached to the second member, wherein the second member is disposed between the first member and the third member, and wherein the third member includes a plurality of additional support units disposed in the folding portion and spaced apart from each other.

11. The cover window of claim 10, wherein an area in which the additional support units are positioned is wider than an area in which the support units are positioned.

12. A manufacturing method of manufacturing the cover window of claim 1, the manufacturing method comprising:
forming the first member;
preparing an original substrate;
etching a first pattern into the original substrate to have a first depth and etching a second pattern into the original substrate to have a second depth which is smaller than the first depth, wherein the second depth is smaller than a thickness of the original substrate;
filling the first pattern and the second pattern with a resin material;
etching a first surface of the original substrate to expose the resin material filled in the second pattern;
cutting the original substrate along the second pattern to form the second member; and
forming the cover window by attaching the first member to the second member.

13. The manufacturing method of claim 12, wherein the etching the first pattern and the second pattern includes:
etching the second pattern into the first surface and a second surface of the original substrate to have a third depth and a fourth depth, respectively,
wherein the second depth is a sum of the third depth and the fourth depth.

14. The manufacturing method of claim 12, wherein the etching the first pattern and the second pattern includes:
etching the first pattern into an area of the original substrate corresponding to the folding portion.

15. The manufacturing method of claim 14, wherein a first surface of each of the support units is attached to the first member and has a width in a range of about 100 µm to about 1000 µm.

16. The manufacturing method of claim 15, wherein the first surfaces of the support units are spaced apart from each other by a distance in a range of about 10 µm to about 100 µm.

17. The manufacturing method of claim 12, wherein the second member has a thickness in a range of about 100 µm to about 1000 µm.

18. The manufacturing method of claim 12, wherein the first member includes ions of at least one type of metal.

19. The manufacturing method of claim 14, wherein an area of the resin material filled in the first pattern has a first surface, which is attached to the first member, and a second surface opposite to the first surface, wherein a width of the second surface of the resin material filled in the first pattern is greater than or equal to a width of the first surface of the resin material filled in the first pattern.

20. The manufacturing method of claim 16, wherein a cross-section of the resin material filled in the first pattern has a triangular shape, a funnel shape, a round funnel shape, or an hourglass shape.

* * * * *